Nov. 12, 1968 U. R. CARPENTIER 3,410,422
DUST TRAP AND VALVE FOR HIGH TEMPERATURE OPERATION
Filed Sept. 26, 1966 4 Sheets-Sheet 1

INVENTOR
URGEL RAMUAL CARPENTIER

BY *Le Blanc & Shur*
ATTORNEYS

Nov. 12, 1968   U. R. CARPENTIER   3,410,422
DUST TRAP AND VALVE FOR HIGH TEMPERATURE OPERATION
Filed Sept. 26, 1966   4 Sheets-Sheet 4

INVENTOR
URGEL RAMUAL CARPENTIER

BY *Le Blanc & Shur*
ATTORNEYS

3,410,422
DUST TRAP AND VALVE FOR HIGH TEMPERATURE OPERATION
Urgel Ramual Carpentier, 3 Bailey Ave., Plattsburgh, N.Y. 12903
Filed Sept. 26, 1966, Ser. No. 581,830
6 Claims. (Cl. 214—17)

ABSTRACT OF THE DISCLOSURE

Disclosed is a dust trap and double flapper valve assembly for removing dust and other foreign particles from closed systems. Each valve is provided with an access door and removable flapper and valve seat to permit simple inspection, cleaning and/or replacement. The valve flappers are actuated by shafts mounted on spaced bearings and provided with adjustable shaft seals rendering the device less susceptible to wear and damage due to hot gases or high temperatures. Double acting cylinders insure positive opening and closing of the valves. The flappers are constructed with a tapered extension to minimize valve clogging.

---

This invention relates to a dust trap for removing dust and other foreign particles from closed systems and more particularly to an improved dust trap assembly and dust valve which permits the inspection, cleaning and/or replacement of the flapper and valve seat without the necessity of disconnecting or removing the entire valve unit from the valve body or completely disassembling the valve body itself. The device of the present invention provides an improved system particularly suited for use in removing large quantities of particulate material, especially from closed systems such as vacuum conveyors or the like subject to above ambient temperatures with increased reliability and speed of operation.

Dust traps are well known and have been used for many years in conjunction with dust collection systems installed in for example, iron ore sintering plants and pelletizing plants. These systems are maintained under vacuum and pressure and the dust traps are utilized to permit the free dumping of dust collected in the systems without exposing the vacuum or the pressure in the system to atmosphere. Normally, a pair of dust valves are installed in a conduit in series and are operated by cycling the opening and closing of the valves such that the gate of the first valve is open and drops the material to be dumped to the closed gate of the second valve. The gate of the first valve then closes and the gate of the second valve opens so that the material falls free. Normally, at no time, during the removal process are the gates of both valves open and thus, the collection system is at all times isolated from the atmosphere.

In applicant's U.S. Patent No. 3,257,045 there is disclosed an improved dust trap and valve arrangement particularly suited for use in environments where the elements of the system are subject to excessive wear. A dusty environment contributes to the rapid wearing of the valve seat and valve flap and for this reason, the patented device provides an assembly wherein the valve seat, valve flap, or both may be readily removed through a suitable inspection and access opening so that they can be periodically repaired or replaced without requiring substantial disassembly and the comitant lost time which accompany the replacement or repair of parts in previous devices of this general type.

In the present device, the advantageous features of the patented invention are retained in conjunction with a novel system particularly adapted and constructed for use in heated environments where the bearings, seals, and working parts of the unit are subjected to above ambient temperatures which might otherwise adversely affect the operation of the system. The device of the present invention provides increased flow capacity, anti-clogging features, and reliability of operation in conjunction with a novel double acting pneumatically operated cylinder drive for the valve gates. To this end the valve body is enlarged adjacent the actuating shaft and the valve flap or gate overlaps the valve seat to provide not only for increased flow but to reduce the likelihood of clogging due to the collection of material at and around the actuating arm of the valve flapper. A double acting pneumatic cylinder is pivoted to a side wall of each of the valve bodies and acts through an actuator link to alternately open one gate and close the other gate of the series valves. An important feature of the present invention resides in the provision of spaced bearings and an adjustable shaft seal rendering the device less susceptible to wear and damage under the adverse effect of hot gases or high temperatures to which the valve assembly may be subjected by the dust collection systems with which it is used.

It is therefore one object of the present invention to provide an improved dust trap assembly.

Another object of the present invention is to provide an improved pneumatic drive system for the series operated gates of a dust trap.

Another object of the present invention is to provide an improved bearing and seal assembly for the actuator shaft of a dust trap.

Another object of the present invention is to provide an improved dust valve having increased operating capacity and a removable valve flapper and seat which are less susceptible to being clogged by particles collected at and around the flapper and seat.

Another object of the present invention is to provide a dust trap valve providing added clearance for the valve gates while at the same time retaining the advantageous features of an easily removable gate and seat. An access aperture is provided in each valve body on the side remote from the actuator shaft which aperture is normally closed off by a removable cover plate cam locked into position in a manner to provide ready access to the interior of the valve bodies but at the same time insuring that during normal operation, the valves are closed tight against the atmosphere.

These and further objects and advantages of the invention will be more apparent upon reference to the following specification, claims and appended drawings, wherein:

Figure 1:
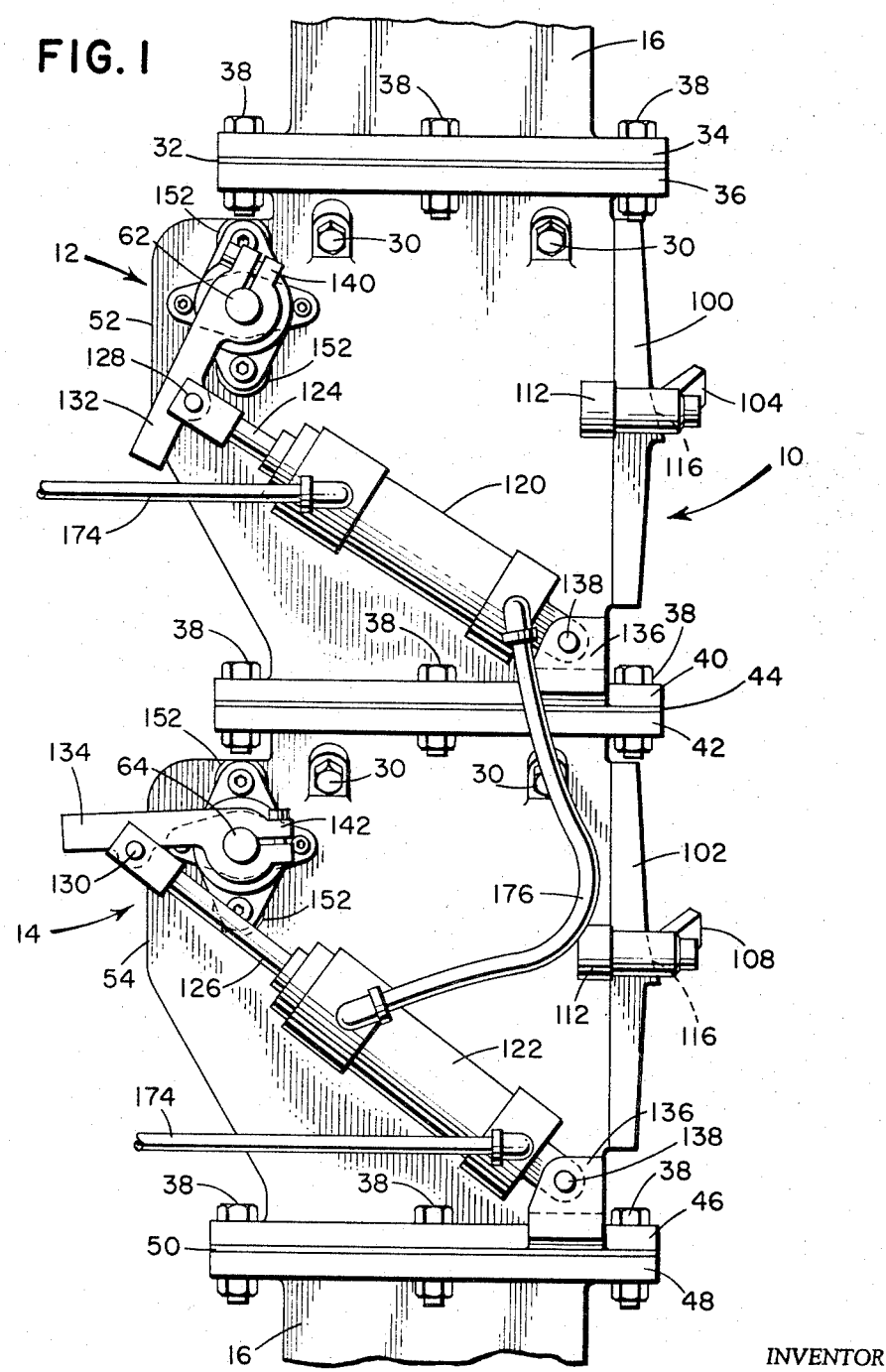
FIGURE 1 is a side elevation of the novel dust trap assembly of the present invention.

Referring to the drawings, the overall dust trap assembly of the present invention generally indicated at 10 in FIGURE 1, comprises a pair of dust valves 12 and 14 connected in series with a conduit 16. Conduit 16 is conventionally connected at its upper end to a dust collection system (not shown) which may be of the type installed in pelletizing plants, sintering plants, quarries, stone crushing plants, plants producing abrasive materials for industry, gold, silver, and copper collection systems, in grain elevators and other similar locations. The purpose of the valves 12 and 14 is to permit the free dumping of the dust under vacuum and pressure in the upper portion of conduit 16 to the atmosphere without exposing the vacuum system in the conduit 16 to atmospheric air.

Figure 3:
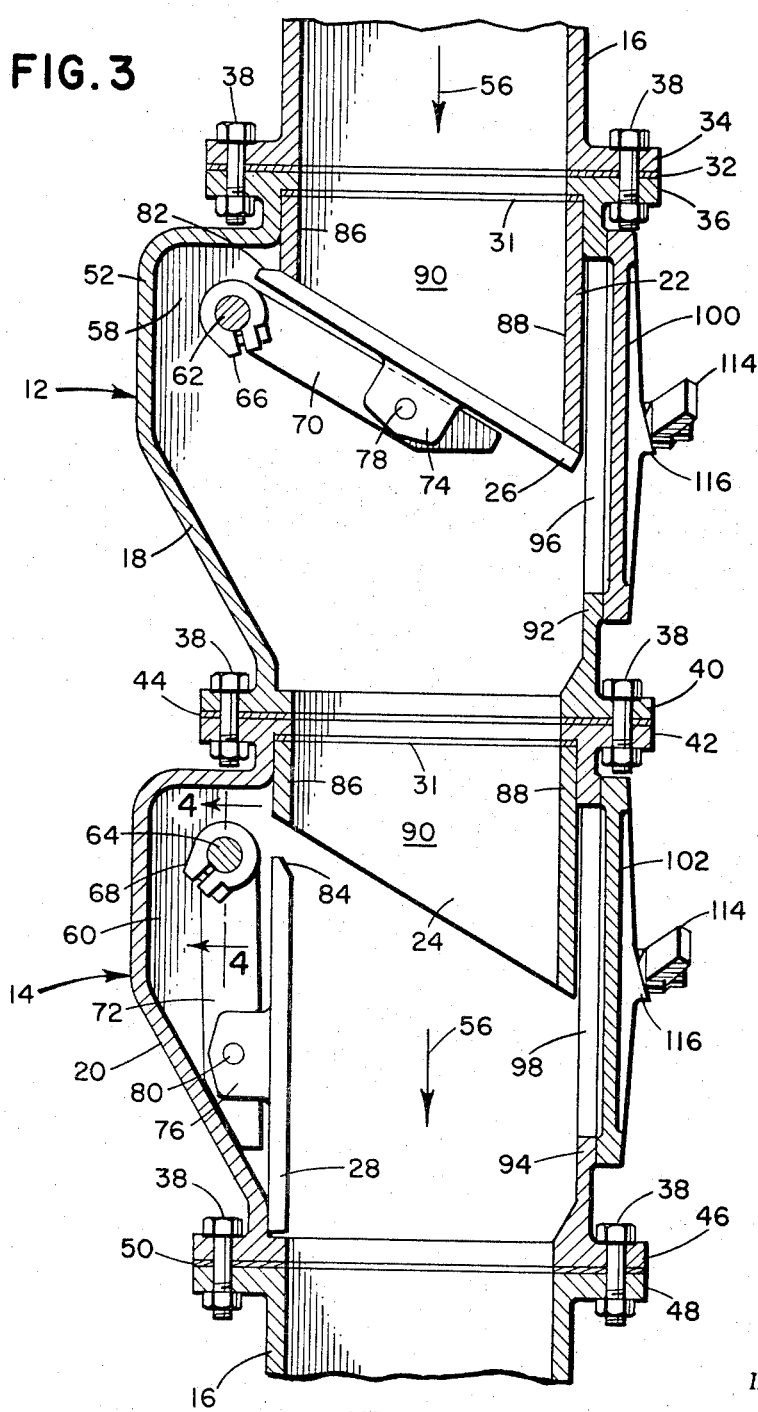
FIGURE 3 is a vertical cross-section through the dust trap of FIGURES 1 and 2, illustrating the sequential or series operation of the valve gates.

Referring in particular to FIGURE 3, the valves comprise a pair of valve bodies 18 and 20 in which are mounted valve seats 22 and 24 and corresponding flappers or gates 26 and 28. Valves 12 and 14 are of identical construction but are operated in sequence such that when the flapper 26 of valve 12 is up against seat 22 closing this valve, the corresponding flapper 28 of valve 14 is in a fully open position illustrated in FIGURE 3. Conversely, when valve 14 is fully closed, valve 26 is open.

Valve seats 22 and 24 are removably mounted within the valve by a plurality of externally adjustable screws 30 illustrated in FIGURE 1 which bear against a flange on the valve seats 22 and 24 to cam the respective valve seat in the position illustrated in FIGURE 3 in a manner more fully described in applicant's U.S. Patent No. 3,257,045. The valve seat 22 in FIGURE 3 is cammed against an annular seal gasket 31. Another gasket 32 is clamped between the flange 34 on conduit 16 and the upper flange 36 of valve body 18. These flanges are joined by a plurality of machine bolts 38. Flange 40 on the lower end of valve body 18 is similarly joined to the upper flange 42 of valve body 14 but separated by a similar annular gasket 44. Flanges 46 and 48 on valve body 14 and the lower portion of conduit 16 are similarly joined by machine bolts 38 and are sealed by annular gasket 50.

Each of the valve bodies 18 and 20 includes an outwardly projecting side wall 52 and 54 spaced outwardly of the main flow path 56 and in conjunction with the remaining portion of the valve bodies define the side chambers 58 and 60. These chambers receive rotatably mounted actuator shafts 62 and 64 which are keyed as at 66 and 68 by Woodruff Keys to actuator arms 70 and 72. Flappers 26 and 28 each include a pair of depending tabs such as the tabs 74 and 76 which extend perpendicular away from the flappers with one along each side of the respective actuator arm 70 and 72. These tabs are suitably apertured as is each actuator arm and the flapper is joined to its actuator arm by a wrist pin as indicated at 78 and 80 in FIGURE 3. The flappers are of generally rectangular configuration and each includes a tapered extension 82 and 84 along one edge which, when the valve is closed, extends beyond the short side wall 86 of its cooperating valve seat. This lessens the likelihood that any material will collect in this area and further prevents material from flowing around the edge of the flapper when it is in the partly or fully opened position to collect in the chambers where it might otherwise adversely affect the operation of the system and interfere with the rotation of the shafts 62 and 64. The wrist pin mounting of the flappers provides an automatic self-adjustment to insure that the gates are fully closed and to compenaste for any wear or misalignment between the valve and valve seats. Each valve seat is also rectangular and in addition to the short wall 86 is provided with an opposite longer wall 88; these two walls being joined by a pair of tapered side walls such as those indicated at 90 in FIGURE 3.

Figure 2:
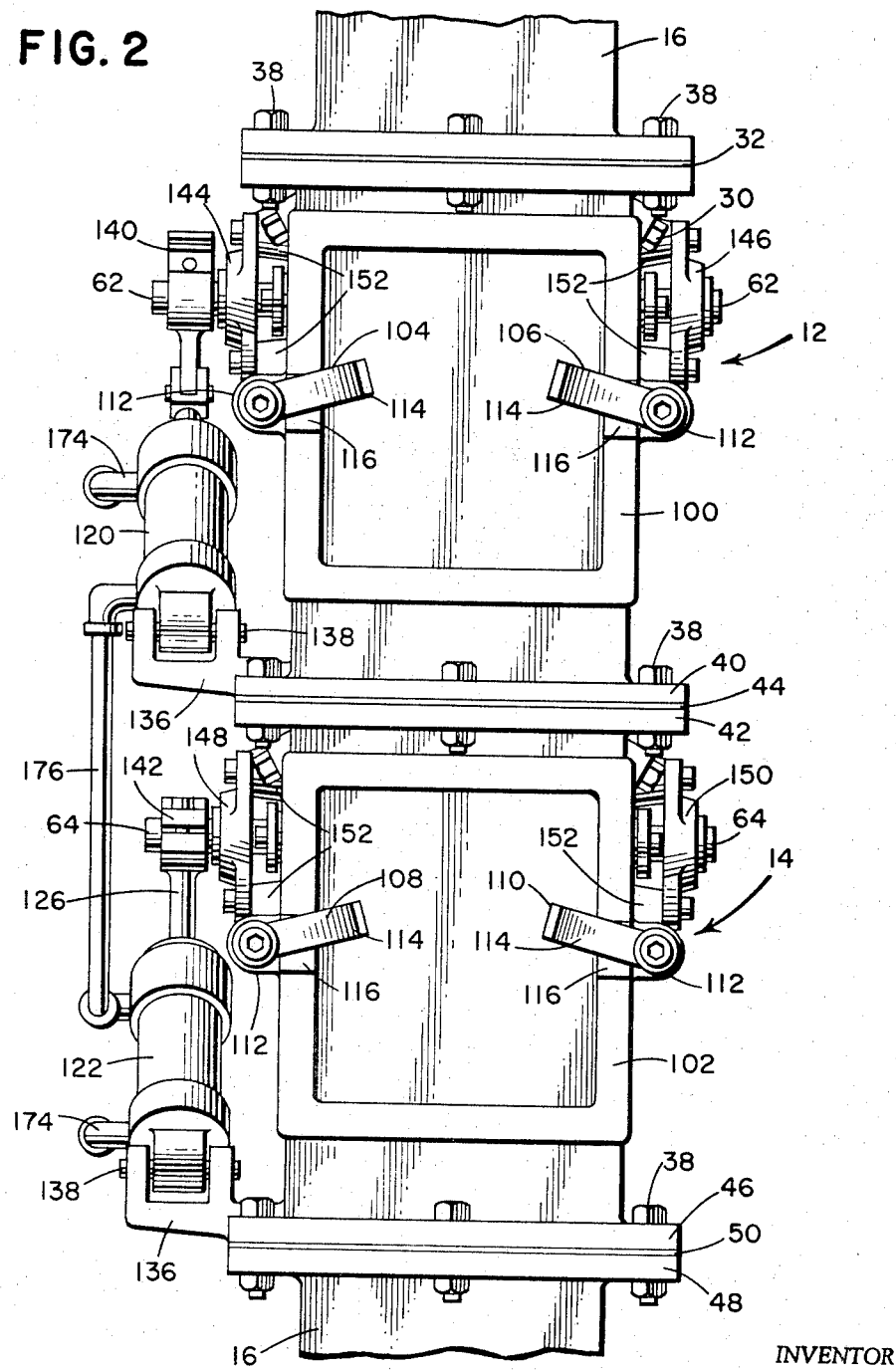
FIGURE 2 is a front elevation of the dust trap of FIGURE 1.

In the side wall 92 and 94 of the valve bodies, opposite from the chambers 58 and 60, are access openings or apertures 96 and 98 preferably of rectangular shape and of such a size as to permit the removal of the flappers and/or the valve seats. These access apertures are closed off by identical covers 100 and 102 with each of the covers provided with a pair of cam locks such as the cam locks 104 and 106 for cover 100 and cam locks 108 and 110 for cover 102 as illustrated in FIGURE 2. These cam locks are rotatably mounted on lugs 112 formed in the valve bodies and include handles 114 whose undersurfaces have flat portions adapted to cam against a tapered boss 116 formed adjacent the outer edges on two sides of each of the covers 100 and 102. When the handles are rotated approximately 180° from the position illustrated in FIGURE 2, the handles clear the covers such that they may be readily removed to permit inspection of the interior of the valves and removal of the seat and flapper if this is necessary. The cam locks have the advantage of being easier and quicker to open than a screw type connection and have the further advantage that with screws, there is a tendency to connect the cover by less than the total number of screw holes provided so that some holes are left open for outside air to leak into the valve through the cover and by the castings.

Referring particularly to FIGURES 1 and 2, the actuator shafts 62 and 64 are driven from a pair of identical pneumatic cylinders 120 and 122. These air cylinders are double acting and each includes a sliding piston connected to a piston rod 124 and 126. The former is illustrated in FIGURE 1 in the fully retracted position to indicate that the valve 12 is closed while the latter is illustrated in FIGURE 1 in the fully extended position indicating that valve 14 is fully opened. The piston rods are connected by a clevis and clevis pin as at 128 and 130 to the respective actuator links 132 and 134. The lower end of each cylinder is pivoted to a mounting bracket 136 attached to each of the valve bodies by a mounting pin 138 provided with suitable cotter pins (not shown) at each end. The cylinders are slanted as illustrated in FIGURE 1 and are free to pivot on the pins 138 as the pistons move through the cylinders.

Figure 4:
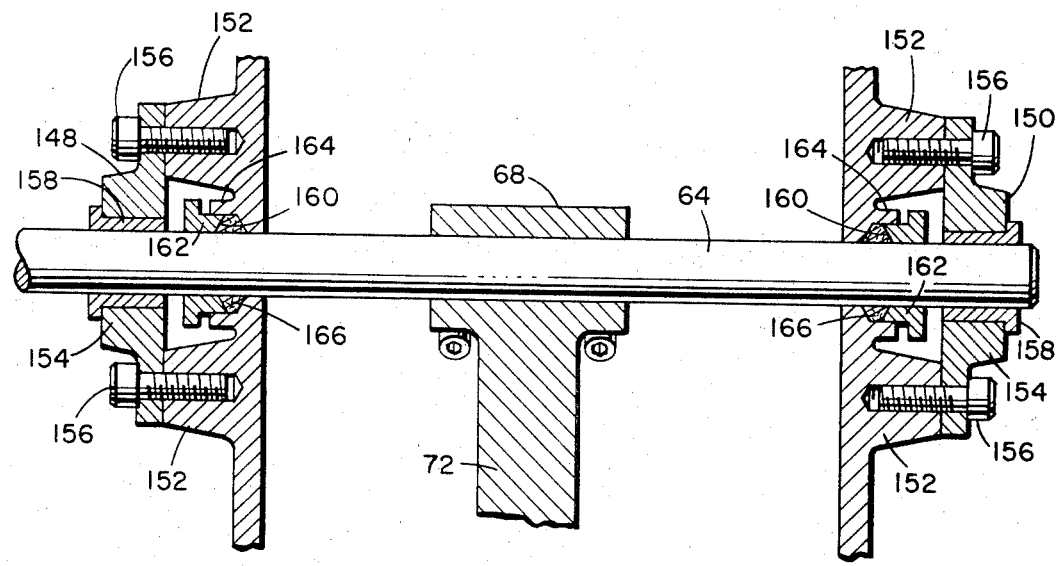
FIGURE 4 is a partial cross-section through the assembly of FIGURE 3, taken along line 4—4 of that figure showing the novel bearing support and adjustable packing seal for the actuator shafts of the valve gates.

Each of the drive links 132 and 134 is connected to its respective actuator shaft by a Woodruff Key as illustrated at 140 and 142 in FIGURES 1 and 2. Shaft 62 is mounted in bearings 144 and 146 while shaft 64 is similarly mounted in bearings 148 and 150. Each bearing is mounted on a pair of bosses 152 formed in the valve bodies which space the bearings outwardly from the valve bodies so that the bearings are not subject to high temperatures resulting from the fluid or dust material passing through the valve which tend to heat the valve body walls. The bearings are illustrated in more detail in FIGURE 4 and comprise housings 154 attached by screws 156 to body bosses or spacers 152 and each bearing also includes a bearing sleeve 158. Interior of each housing wall where the shaft goes through is an adjustable shaft seal 160 comprising a sealing cap 162 which is held in place with cap screws and which surrounds the shaft. It is received in a projection 164 in the valve wall so as to adjustably compress packing 166 into sealing engagement with the actuator shaft 64. It is understood that the other actuator shaft 62 is similarly mounted and sealed.

Figure 5:
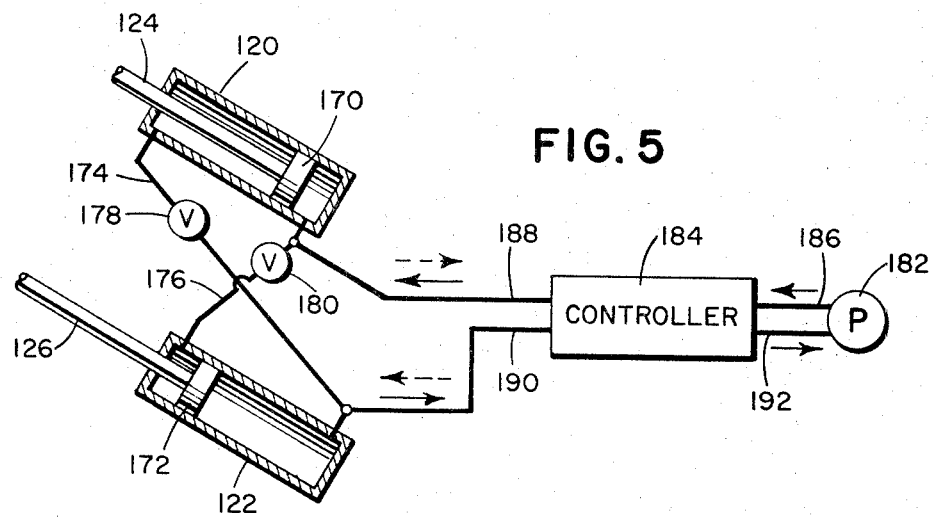
FIGURE 5 is a schematic diagram showing the pneumatic circuit for actuating the valve gates.

FIGURE 5 is a diagrammatic showing of the pneumatic drive for the cylinders 120 and 122. Within each cylinder is a piston 170 and 172, connected to the piston rods 124 and 126. These cylinders are interconnected by a pair of air lines 174 and 176 illustrated as air hoses in FIGURES 1 and 2 with the former connecting the upper end of cylinder 120 to the lower end of cylinder 122 and the latter the lower end of cylinder 120 to the upper end of cylinder 122. Positioned in each line as shown in FIG- URE 5 is a metering valve 178 and 180 which insures a completely balanced system and provides for equalization of pressures between the two cylinders so that one valve does not close before the other opens and vice versa. These cylinders are driven from a source of air under pressure illustrated at 182 through a controller 184 in the form of a switch which may be manually operated, electrically operated, or otherwise suitably actuated to connect the high pressure line 186 from source 182 either to control output line 188 or 190. When the high pressure from source 182 is fed to line 188 piston rod 124 is extended and rod 126 retracted opening valve 12 and closing valve 14. At this time, the low pressure return is from the opposite side of the pistons 170 and 172 through line 190 and low pressure source return line 192 as indicated by the solid arrows in FIGURE 5. When controller 186 is actuated to connect the high pressure line 186 to line 190 the flow is in the direction of the dashed arrows in FIGURE 5 and the pistons and rods assume the position illustrated in FIGURES 1 and 5 with valve 12 closed and valve 14 open.

It is apparent from the above, that the present invention provides an improved dust trap and dust valve assembly of the removable element type having increased capacity, improved reliability of operation, and providing for the simple, effective and rapid inspection and replacement of the wearing parts of the valve. Important features include the separation of the support bearings from the hot body elements of the valve, a novel balanced pneumatic drive system for the actuator shaft, a valve construction providing increased flow areas in the assembly, and cam locked removable access covers providing an optimum sealing arrangement for preventing the egress of atmospheric air into the system so as to maintain the proper vacuum or pressure at all times. The mechanical elements of the valve and system are designed for optimum reliability and positioned to insure full operation of the valve gates or flappers so that the valves are never both open at the same time. Double acting cylinders are provided to insure positive opening and closing of the valves in conjunction with a flapper construction which minimizes the possibility of the valves clogging and reduces the tendency of particulate material to collect in the area of the actuator shaft and actuator arm supporting the movable flappers.

In order to remove the flapper from one of the valves the cam locks are simply rotated to release the covers and these covers are removed from the access opening. This provides access to the interior of the valve where it may be inspected and if necessary the seal and flapper removed. The set screws 30 supporting the valve seat are first loosened from the exterior of the valve. The seat is then dropped down and removed through the side access opening which is made possible by the long and short side construction of the valve seat and the clearance provided between the valve seat and its actuating structure and the valve flapper or gate. Finally the wrist pin is removed from the flapper so that the flapper also may be removed from the valve. Each valve is a complete unit with its own actuating mechanism and the valves 12 and 14 are completely interchangeable.

The valves can be installed together in series as shown or may be used in separate sections of discharge pipe lines. Foreign materials may be easily removed through the side openings or access openings without the necessity for dismantling the pipe line and the accompanying increase in cost and loss of operating time. Multiple units need be operated by a single solenoid valve type controller and timer. The only replacement parts required are the valve flaps and seats. The air cylinders operate on normal air pressure in the neighborhood of 60 to 80 p.s.i.g. and require only a small amount of air per complete cycle of both double acting air cylinders. The valve closes rapidly so as to maintain a clean seat and opening area. The unique side access cover particularly with the cam lock fasteners, allows easy opening of the valve for inspection, for the removal of foreign materials and replacement of the flap or seat if necessary. The large rectangular access openings make the interior of the valves readily accessible and visible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dust valve comprising a valve body having a cylindrical flow path therethrough from one end to the other, said flow path having a rectangular cross-section, said valve body including an enlarged portion defining a chamber communicating with one side of said flow path, said valve body including a rectangular access opening in its side opposite from said chamber, a cover for said access opening, a pair of cam locks on said body for securing said cover to said body over said opening, an actuator shaft passing through said chamber and extending outwardly on opposite sides of said body, a pair of bearings spaced from said body and supporting the ends of said shaft, a cylindrical valve seat removably mounted in said valve body, said valve seat having a flow path therethrough substantially concentric with the flow path through the adjacent portion of said valve body, said valve seat having a short side and an opposite long side adjacent said access opening, a removable valve flapper carried by said shaft for movement into and out of engagement with said valve seat, and a double acting cylinder coupled to rotatably drive said shaft.

2. A valve according to claim 1 including an adjustable seal for said shaft between each of said bearings and said valve body.

3. A valve according to claim 1 wherein said cylinder is coupled to a source of air under pressure, said cylinder being pivoted at one end and having its other end coupled through a mechanical linkage to said shaft.

4. A valve according to claim 1 wherein said valve seat and valve flapper are rectangular, said flapper having one edge projecting beyond said valve seat and into said chamber when said valve is closed.

5. A dust trap comprising a trap body of rectangular cross-section having a flow path therethrough from one end to the other, said trap body including a pair of enlarged portions defining a pair of spaced chambers communicating with one side of said flow path, said tray body including a rectangular access opening across from each of said chambers, a cover for each opening, a pair of cam locks on said body adjacent each opening for securing said covers to said body over said openings, an actuator shaft passing through each chamber and extending outwardly on opposite sides of said body, two sets of bearings each spaced from said body and supporting the ends of said shafts, a cylindrical valve seat removably mounted in said trap body adjacent each access opening, said valve seats each having a flow path therethrough substantially concentric with the flow path through the adjacent portion of said trap body, each valve seat having a short side and a diametrically opposite long side adjacent a respective access opening, a removable valve flapper carried by each shaft for movement into and out of engagement with its valve seat, a pair of pneumatic cylinders pivotally mounted at one end on said trap body, said cylinders having their other ends coupled through a mechanical linkage to said shafts, a source of air under pressure, and a controller for supplying air first to one end and then to the other end of each cylinder.

6. A dust trap according to claim 5 wherein one end of one cylinder is coupled by a hose to the opposite end of the other cylinder, and a metering valve in each hose for balancing the pressure in each cylinder.

References Cited

UNITED STATES PATENTS

| | | | |
|---|---|---|---|
| 214,758 | 4/1879 | Condit | 292—241 |
| 985,933 | 3/1911 | Pletsch | 292—241 |
| 1,238,731 | 9/1917 | Anderson | 308—36.1 X |
| 1,965,698 | 7/1934 | Goecke | 308—22 |
| 2,626,066 | 1/1953 | Rasmussen | 214—17 |
| 2,708,040 | 5/1955 | Somogyi | 214—17 |
| 2,912,126 | 11/1959 | Alspaugh et al. | 214—17 |
| 3,183,047 | 5/1965 | Ribble | 308—22 |
| 3,257,045 | 6/1966 | Carpentier | 222—450 |

FOREIGN PATENTS

| | | |
|---|---|---|
| 1,208,769 | 9/1959 | France. |
| 886,191 | 1/1962 | Great Britain. |

SAMUEL F. COLEMAN, *Primary Examiner.*

KENNETH N. LEIMER, *Assistant Examiner.*